Figure 1:
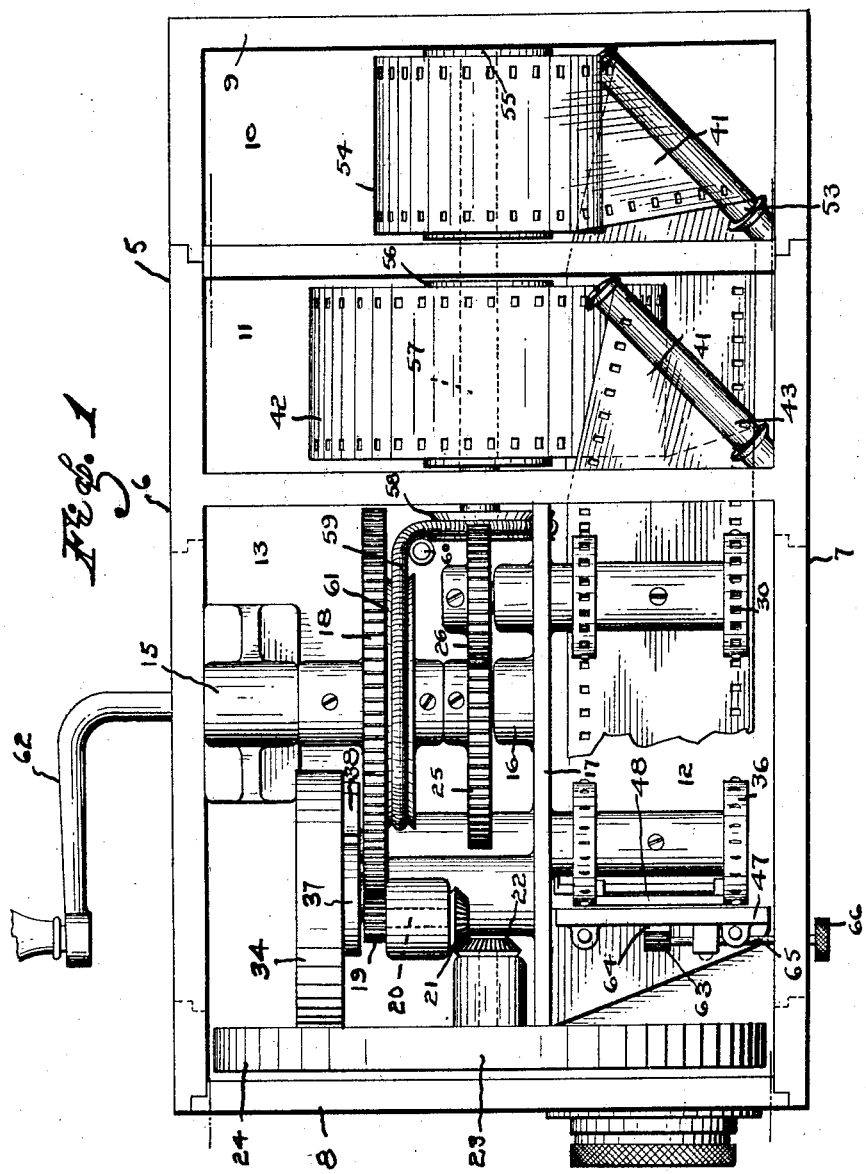

O. R. DE LISLE.
MOTION PICTURE CAMERA AND PROJECTOR.
APPLICATION FILED MAR. 7, 1916.

1,334,931.

Patented Mar. 23, 1920.
2 SHEETS—SHEET 1.

O. R. DE LISLE.
MOTION PICTURE CAMERA AND PROJECTOR.
APPLICATION FILED MAR. 7, 1916.

1,334,931.

Patented Mar. 23, 1920.
2 SHEETS—SHEET 2.

WITNESSES:

INVENTOR.
BY
ATTORNEYS.

UNITED STATES PATENT OFFICE.

OTTO R. DE LISLE, OF SAN FRANCISCO, CALIFORNIA, ASSIGNOR, BY MESNE ASSIGNMENTS, TO PACIFIC CAMERA COMPANY, A CORPORATION OF NEVADA.

MOTION-PICTURE CAMERA AND PROJECTOR.

1,334,931.	Specification of Letters Patent.	Patented Mar. 23, 1920.

Application filed March 7, 1916. Serial No. 82,565.

*To all whom it may concern:*

Be it known that I, OTTO R. DE LISLE, a subject of the King of England, residing at the city and county of San Francisco, State of California, have invented a new and useful Improvement in Motion-Picture Cameras and Projectors, of which the following is a specification.

This invention comprehends certain new and useful improvements in motion picture cameras and projectors, and relates more particularly to a machine of this nature having a novel arrangement of parts to produce a very compact structure.
One of the objects of the invention is to provide a motion picture camera and projector having the film rolls arranged in axial alinement thereby making it possible to build a machine of very restricted dimensions.

Another object of the invention is to provide in a machine of this nature a novel form of film feed in which slot and cam mechanism is employed to drive an intermittent sprocket to feed the film past the aperture plate or frame.

A further object of the invention is to provide a device of this nature which shall be of extremely simple construction, cheap to manufacture, compact in form, and a general improvement over machines of a similar nature now on the market.

Other objects and advantages will appear as the description progresses.
In the drawings, forming a part of the present specification to which like reference characters have been added, a preferred form of putting this invention into practice is shown. I do not wish to be understood as confining this invention to the disclosures made in said drawings and description, as many variations may be introduced within the scope and spirit of the invention as defined in the claims succeeding said description.

Figure 2:
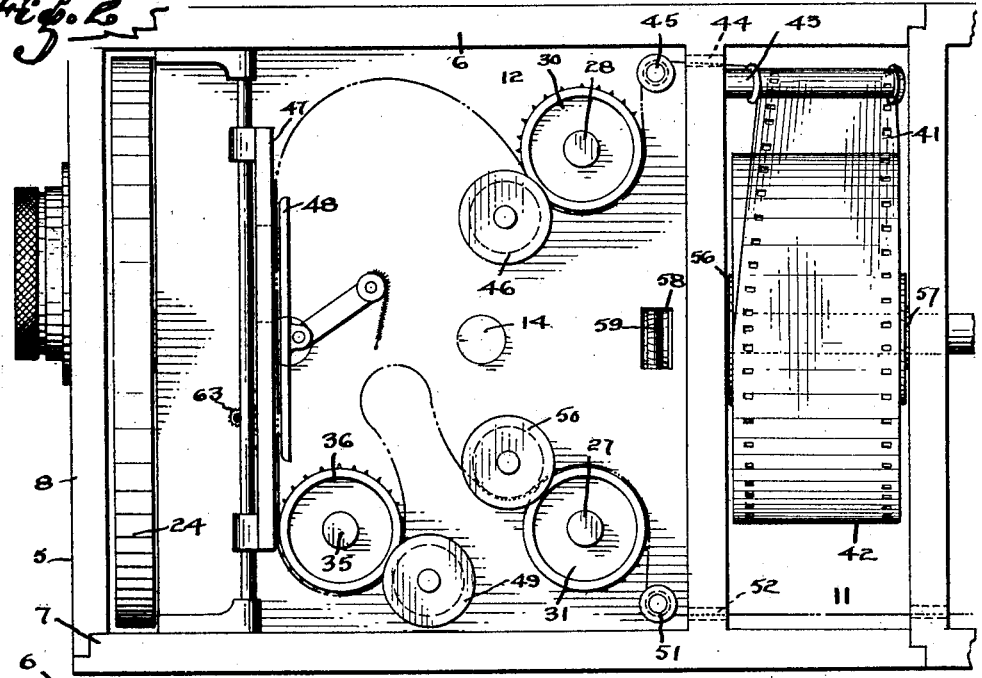
Figure 3:
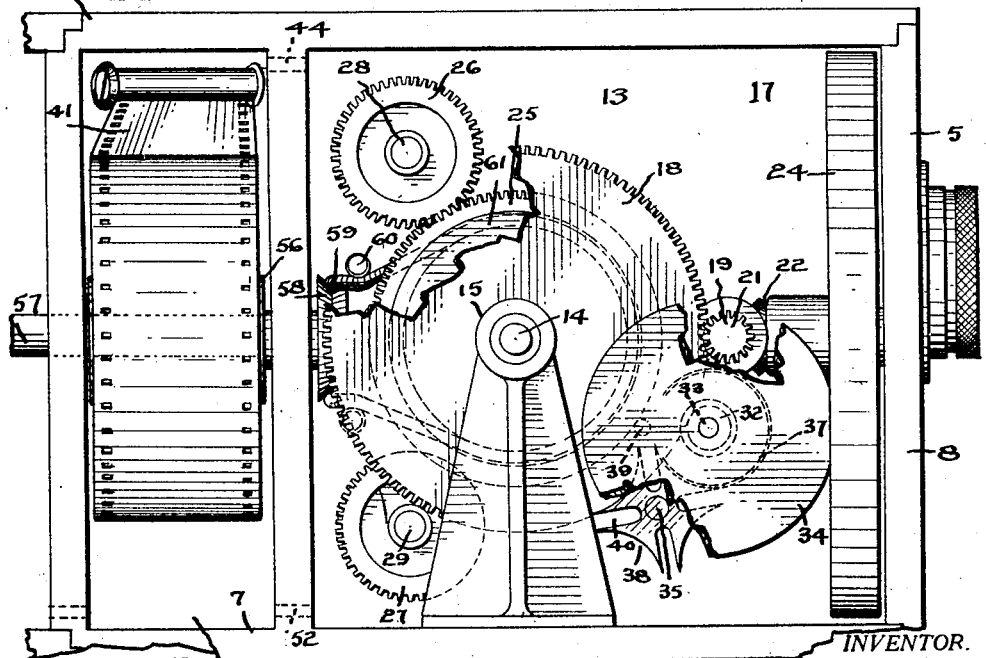

In the drawings:

Figure 1 is a top plan view of the camera and projector with the top of the camera box removed.
Fig. 2 is a fragmentary side elevation with the near wall of the camera removed to show the internal mechanism of the machine, and Fig. 3 is a fragmentary side elevation showing the reverse side of the machine from that shown in Fig. 2 and illustrating the gears employed in driving the film and shutter.

Referring in detail to the drawings by numerals, 5 designates as entirety the box or casing forming a part of the camera and projector. The box or casing comprises a top wall 6, a bottom wall 7, end walls 8 and 9, and side walls. Internally it is divided into two film roll compartments 10 and 11, a film sprocket compartment 12, and a gear compartment 13. A main shaft 14 extends transversely through the gear compartment 13, and is supported in the bearings 15 and 16, the latter bearing being an integral part of the main frame 17 which forms the compartments 12 and 13. A master gear 18 is rigidly secured to the main shaft 14 and meshes with a pinion 19 on a shaft 20 which latter carries a miter gear 21 in mesh with a similar gear 22 on the shaft 23 which is rigidly connected to shutter 24.

In addition to the master gear 18, the main shaft 14 also carries a main film driving spur gear 25 which meshes with the smaller spur gears 26 and 27 on the shafts 28 and 29 respectively. These shafts extend through the main frame into the sprocket chamber 12 and are respectively provided with the sprockets 30 and 31.

The gear 18 also drives a small pinion 32 on the shaft 33 and this shaft carries a heavy balance or fly wheel 34 which by means of cam mechanism, to be hereinafter described, drives the shaft 35 which extends into the sprocket chamber 12, and carries in said chamber the sprocket 36.

On the interior or inner side of the balance wheel 34 I provide a cam ring 37 for coöperation with the Maltese cross or star 38, which is intimately rotated by the pin 39 which passes in and out of the slots 40.

In taking pictures the film 41 is fed from the roll 42 in the compartment 11 over a direction changing roller 43, through a slot 44, over the idler 45, around under the sprocket 30 which is in contact with the idler 46, and then down between the aperture plate 47 and the gate or pressure plate 48 to the sprocket 36. This sprocket is in contact with the idler 49 and from here the film passes between the idler 50 and the sprocket 27 to the idler 51, and from here it passes through a slot 52 to the compartment 10 and then over the direction changing roller 53 to the new roll which is being formed and designated by the numeral 54. It will be noted that the two rolls are carried in axial alinement, whereby I can greatly decrease the length and hence diminish the clumsiness of the machine. It will be noted that the rollers 43 and 53 give a right angle turn to the film.

The reels 55 and 56 are supported on the shaft extending longitudinally of the camera and projector 57 which shaft is provided on one end with a pulley 58 which is driven by an endless spring belt 59 running around the idlers 60 and over the pulley 61 on the main shaft 14. The spool 56 is loose on the shaft 57 whereas the spool 55 is fixed to the shaft, so that the new roll 54 is driven to wind the film thereon. The roll is free running so that the film may be drawn therefrom by the sprocket 30.

In operation the main shaft 14 is driven by the hand operated crank 62 and its rotation is imparted to the master gear 18 which drives the shutter 24 through the medium of the pinion 19 and the miter gears 21 and 22. The rotation of the gear 18 drives the balance wheel 34 and this wheel through the Geneva movement or star and cam mechanism heretofore described, drives the shaft 35 to which is secured the intermittent sprocket 36 which feeds the film strip past the aperture in the aperture plate 37. The sprocket 31 being driven as before described picks up the film as it is fed by the intermittent sprocket 36 and passes it on to the newly forming roll 54. The gears are properly proportioned and designed to cause a steady feed of the film as the crank is being turned and prevent the film piling up or binding in any place. The gate or pressure plate 48 serves to hold the film in close engagement with the aperture plate or frame which latter may be adjusted by means of the pinion 63 and rack 64, the former being connected to a shaft 65 carrying a knurled knob 66.

From the foregoing description taken in connection with the accompanying drawings, it will be apparent that I have provided a very simple, compact and practical moving picture camera and projector, which is equally well adapted for the taking and projecting of the pictures and which may be cheaply manufactured since it is devoid of complicated mechanism.

While I have shown and described the preferred embodiment of my invention, it will be understood that I do not wish to be limited to the exact formation herein shown and described, but may make such changes as fall within the scope and spirit of the invention as claimed. The sprockets 30 and 31 and the spools 45, 46, 49, 50 and 51 are in alinement with each other and with the shutter opening.

I claim—

1. In a motion picture apparatus having a shutter, a drive shaft, a reel shaft extending longitudinally of the apparatus, means whereby said reel shaft is driven by said drive shaft, a let-off reel loosely mounted on said reel shaft, a film sprocket, film guiding means, said sprocket being arranged in alinement with the shutter opening of the apparatus, means whereby said sprocket is driven to feed the film past said shutter opening, and a take-up reel secured to said reel shaft.

2. In a motion picture apparatus having a shutter, a drive shaft, a reel shaft extending longitudinally of the apparatus, a pulley on said drive shaft, a pulley on said reel shaft, a roller between said pulleys, a belt extending over said pulleys and roller, a let-off reel loosely mounted on said reel shaft, a film sprocket, film guiding means, means whereby said sprocket is driven to feed the film past said shutter opening, and a take-up reel secured to said reel shaft.

In testimony whereof, I have hereunto set my hand at San Francisco, California, this 3rd day of January 1916.

OTTO R. DE LISLE.

In presence of—
A. J. HENRY,
BALDWIN VALE.